(12) United States Patent
Feng et al.

(10) Patent No.: US 11,788,829 B2
(45) Date of Patent: Oct. 17, 2023

(54) SIMULTANEOUS PHASE-SHIFT POINT DIFFRACTION INTERFEROMETER AND METHOD FOR DETECTING WAVE ABERRATION

(71) Applicant: Shanghai Institute of Optics And Fine Mechanics, Chinese Academy of Sciences, Shanghai (CN)

(72) Inventors: Peng Feng, Shanghai (CN); Zhongliang Li, Shanghai (CN); Xiangzhao Wang, Shanghai (CN); Yang Bu, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 12 days.

(21) Appl. No.: 17/728,674

(22) Filed: Apr. 25, 2022

(65) Prior Publication Data
US 2023/0160684 A1 May 25, 2023

(30) Foreign Application Priority Data
Nov. 19, 2021 (CN) .......................... 202111392143.8

(51) Int. Cl.
*G01B 9/02* (2022.01)
*G01B 9/02055* (2022.01)

(52) U.S. Cl.
CPC ..... *G01B 9/02041* (2013.01); *G01B 9/02034* (2013.01); *G01B 9/02075* (2013.01); *G01B 2290/70* (2013.01)

(58) Field of Classification Search
CPC ............ G01B 9/02041; G01B 9/02034; G01B 9/02075; G01B 2290/07; G01M 11/0271; G03F 7/706
See application file for complete search history.

(56) References Cited

U.S. PATENT DOCUMENTS

| | | | |
|---|---|---|---|
| 2004/0114150 A1* | 6/2004 | Wegmann | G03F 7/70591 356/520 |
| 2007/0182969 A1* | 8/2007 | Mengel | G01J 9/02 356/495 |
| 2017/0184455 A1* | 6/2017 | Wang | G01J 9/0215 |

FOREIGN PATENT DOCUMENTS

CN 103267629 A 8/2013

* cited by examiner

*Primary Examiner* — Jonathan M Hansen
(74) *Attorney, Agent, or Firm* — Mei & Mark LLP; Manni Li (57) ABSTRACT

A simultaneous phase-shift point diffraction interferometer and method for detecting wave aberration. The interferometer comprises an ideal spherical wave generation module, an optical system to be measured, an image plane mask, a polarization phase shift module, a two-dimensional polarization imaging photodetector and a data processing unit. Single photodetector is adopted to realize simultaneous detection of more than three phase shift interference patterns, and has the advantages that environmental interference suppression, a flexible optical path, high measurement accuracy, and calibration of system errors of the interferometer may be realized.

8 Claims, 4 Drawing Sheets

SIMULTANEOUS PHASE-SHIFT POINT DIFFRACTION INTERFEROMETER AND METHOD FOR DETECTING WAVE ABERRATION

CROSS-REFERENCE TO RELATED APPLICATIONS

The subject application claims priority to Chinese Patent Application No. 202111392143.8 filed on Nov. 19, 2021, in China. The Chinese priority application is incorporated herein by reference.

TECHNICAL FIELD

The present invention relates to the field of interference measurement, in particular to a simultaneous phase-shift point diffraction interferometer and method for detecting wave aberration.

BACKGROUND ART

Wave aberration is an important parameter to describe the performance of small aberration imaging optical system. The wave aberration of high-quality microobjective and space telescope should be less than $\lambda/4PV$ or $\lambda/14RMS$ ($\lambda$ is the operating wavelength and RMS is the root mean square value). It puts high demands on the high-precision wavefront detection technology that is not influenced by the environment when a high-quality imaging optical system is first installed.

Chinese Invention Patent Application 201310126148.5 to Tang, Feng et al. discloses a point diffraction interference wave aberration measuring instrument and the detection method. Two ideal spherical waves are generated on the object plane of the optical system to be measured, the light intensity, polarization state, and optical path difference of the two waves are adjustable, high interference visibility may be generated, and system errors may be eliminated from the measurement results. However, because it belongs to a quasi-common optical path system and uses traditional PZT phase shift technology, the system is sensitive to vibration noise, air disturbance, and other factors when using a phase shift algorithm, which restricts the use conditions of the interferometer.

SUMMARY OF THE INVENTION

The purpose of the present invention is to overcome the above shortcomings and provide a simultaneous phase-shift point diffraction interferometer and method for detecting wave aberration. The simultaneous phase-shift point diffraction interferometer has the advantages that environmental interference suppression, flexible optical path, high measurement accuracy, and can calibration the system errors of the interferometer.

The present invention provides a simultaneous phase-shift point diffraction interferometer that comprises ideal spherical wave generation module, image plane mask, polarization phase shift module, two-dimensional polarization imaging photodetector, and data processing unit (12) connected with the two-dimensional polarization imaging photodetector;

the ideal spherical wave generation module is located in object field of optical system to be measured and used for generating two beams of polarized light, namely left-handed circularly polarized light and right-handed circularly polarized light;

the image plane mask is located on image plane of the optical system to be measured, and at least comprises a light-transmitting window and a filtering circular hole, the light-transmitting window is used for allowing an spherical wavefront generated by the spherical wavefront generation module to pass through to form measurement light with wave aberration information of the imaging system to be measured, and the filtering circular hole is used for generating reference spherical waves;

and the polarization phase shift module is used for converting input light into output light with different polarization states, and after realizing polarization phase shift, the two-dimensional polarization imaging photodetector collects and stores measurement data.

The ideal spherical wave generation module is comprises of a fiber and a quarter-wave plate, or free space optical path composed of optical elements;

the polarization phase shift module is a micro-polarization array, polarization directions of four polarizers in each unit are 0°, 45°, 90°, and 135° respectively, the size of the polarizer is the same as that of a pixel unit of the two-dimensional polarization imaging photodetector, and each polarizer is aligned with one pixel unit of the two-dimensional polarization imaging photodetector;

and the two-dimensional polarization imaging photodetector is a Charge Coupled Device (CCD), Complementary Metal Oxide Semiconductor (CMOS), two-dimensional photocell array, or two-dimensional photodetector array with an optical panel.

The present invention further provides a method for detecting wavefront aberration of optical system by using the simultaneous phase-shift point diffraction interferometer comprises the following steps:

locating the output end of the ideal spherical wave generation module (5) at the position of a field point to be measured in the object field of the optical system to be measured;

making the image point of first output light imaged by the optical system to be measured aligned with the center of filtering circular hole of the image plane mask, and the image point of second output light imaged by the optical system to be measured located in a light-transmitting window of the image plane mask;

making polarization directions of output light of the first output end and output light of the second output end of the ideal spherical wave generation module perpendicular to each other; adjusting light intensities of the output light of the first output end and the output light of the second output end of the ideal spherical wave generation module so that the intensity of interference pattern collected by two-dimensional polarization imaging detector reaches 0.6-0.9 of saturated light intensity of the photoelectric sensor, and the interference visibility is better than 0.6;

inputting the interference patterns collected by the two-dimensional polarization imaging detector into the data processing unit, extracting, by the data processing unit, pixel units with the same phase shift from the collected interference patterns through sampling and combination to form four-step phase shift interference image with fixed additional phase difference $\pi/2$, then solving the phase by phase extraction algorithm, and performing phase unwrapping to obtain phase distribution Ws which is the error calibration result of the detection system;

making two output image points of the ideal spherical wave generation unit located in the light-transmitting window of the image plane mask;

inputting the interference patterns collected by the two-dimensional polarization imaging detector into data processing unit, extracting, by the data processing unit, pixel units with the same phase shift from the collected interference patterns through sampling and combination to form four-step phase shift interference image with fixed additional phase difference π/2, then solving the phase by phase extraction algorithm, and performing phase unwrapping to obtain phase distribution Wt which is the direct measurement result; and calculating, by the data processing unit, the optical system wavefront aberration Wr of the optical system to be measured at a field point where an output end of the ideal spherical wave generation unit is located by the formula Wr=Wt−Ws.

Compared with the prior art, the present invention has the advantage of high-precision measurement of the traditional point diffraction interferometer, overcomes the defect of environment dependence of the traditional point diffraction interferometer by adopting the dynamic polarization phase shift technology, and can applicable to factories and workshops with complex environments for high-precision detection and adjustment of imaging systems.

DETAILED DESCRIPTION OF THE INVENTION

Hereinafter, the technical solution in the embodiments of the present invention is described clearly and fully with reference to the drawings in the embodiments of the present invention. Obviously, the described embodiments are only part of the embodiments of the present invention, not all of the embodiments.

Figure 1:
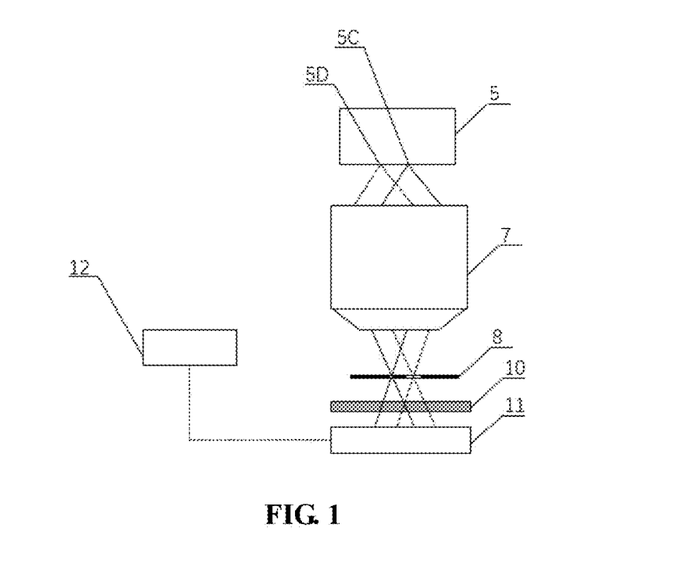
FIG. 1 shows the structure of the simultaneous phase-shift point diffraction interferometer of the present invention.

As shown in FIG. 1, the simultaneous phase-shift point diffraction interferometer of the present invention comprises an ideal spherical wave generation module 5, an optical system to be measured 7, an image plane mask 8, a polarization phase shift module 10, and a two-dimensional polarization imaging photodetector 11, which are sequentially arranged in a direction of output light of the ideal spherical wave generation module 5, and the two-dimensional polarization imaging photodetector 11 is connected with the data processing unit 12.

Figure 2:
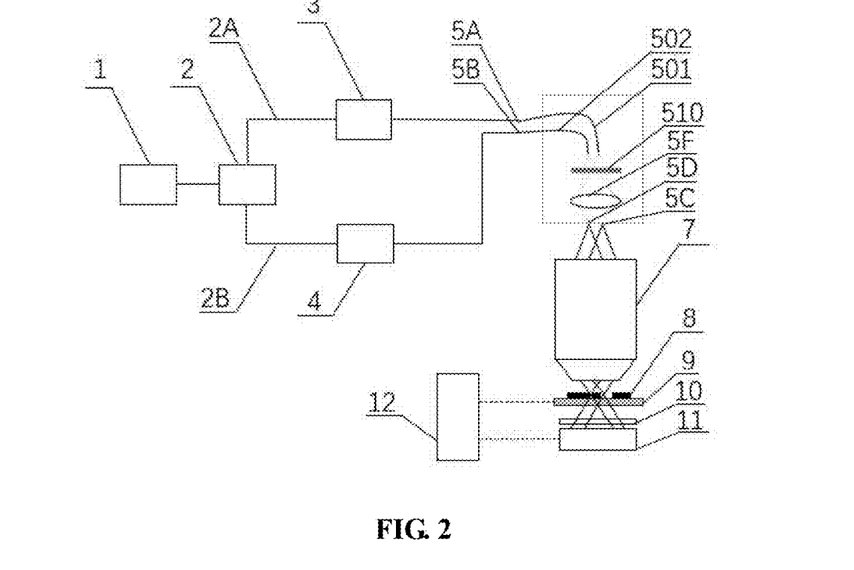
FIG. 2 shows the structure of one embodiment of the simultaneous phase-shift point diffraction interferometer of the present invention.

As shown in FIG. 2, one embodiment of the simultaneous phase-shift point diffraction interferometer of the present invention comprises a light source 1, an optical splitter 2, a first light intensity and polarization state regulator 3, a second light intensity and polarization state regulator 4, an ideal spherical wave generation unit 5, an optical system to be measured 7, an image plane mask 8, a precision adjustment stage 9, a micro polarizer array 10, a two-dimensional polarization imaging photodetector 11, and a data processing unit 12. The positional relationship of the above parts is as follows:

The optical splitter 2 is in a forward direction of output light of the light source 1. The optical splitter divides incident light into first light path 2A and second light path 2B. The first light path 2A is connected with the first light intensity and polarization state regulator 3, and the second light path 2B is connected with the second light intensity and polarization state regulator 4. Then, the two paths of light are both connected to an input end of the ideal spherical wave generation unit 5. An output end of the ideal spherical wave generation unit 5 is located at an object space field point of the optical system to be measured 7, and is imaged to the image plane of the optical system to be measured 7. The image plane mask 8 installed on the precision adjustment stage 9 is located on the image plane of the optical system to be measured 7. After passing through the image plane mask 8, the two paths of light pass through the polarization phase shift module 10 and are received by the two-dimensional polarization imaging photodetector 11, and an output signal of the two-dimensional polarization imaging photodetector is input to the data processing unit 12 for processing. The data processing unit 12 is connected with the first light intensity and polarization state regulator 3, the second light intensity and polarization state regulator 4 and the precision adjustment stage 9 through cables to control them.

The light source 1 is a laser output by a polarization maintaining fiber with wavelength λ=532 nm.

The optical splitter 2 is a fiber beam splitter.

The first light intensity and polarization state regulator 3 and the second light intensity and polarization state regulator 4 are devices for adjusting the light power and polarization state of passing light.

The ideal spherical wave generation unit 5 is a device that converts light input from its input ends 5A and 5B into ideal spherical waves in an output numerical aperture range at its output ends 5C and 5D. A minimum value of an output numerical aperture of the ideal spherical wave generation unit 5 is the object space numerical aperture of the optical system to be measured 7. The object space numerical aperture of the optical system to be measured 7 is 0.06.

Figure 3:
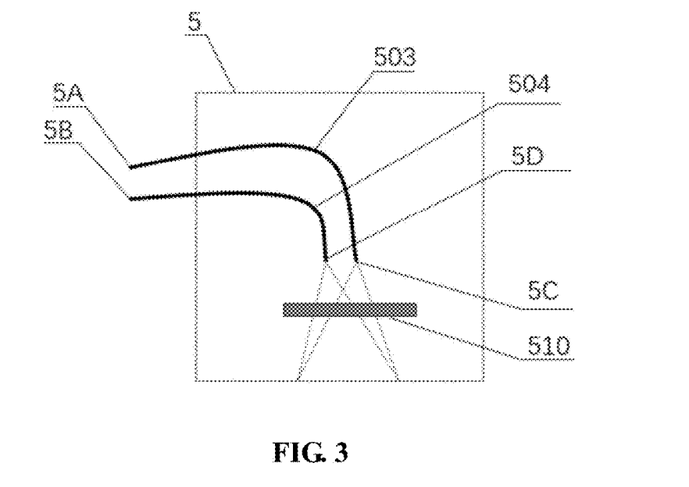
FIG. 3 shows the structure of the first embodiment of the ideal spherical wave generation unit in the present invention.

As shown in FIG. 3, the first embodiment of the ideal spherical wave generation unit 5 of the present invention is composed of a first optical fiber 501, a second optical fiber 502 and a quarter-wave plate 510. An input end of the first optical fiber is a first input end 5A of the ideal spherical wave generation unit 5, and an output end is a first output end 5C of the ideal spherical wave generation unit 5. An input end of the second optical fiber is a second input end 5B of the ideal spherical wave generation unit 5, and an output end is a first output end 5D of the ideal spherical wave generation unit 5. The first optical fiber 501 and the second optical fiber 502 are single mode optical fibers, and the first optical fiber 501 and the second optical fiber 502 may also be polarization maintaining optical fibers. Core diameters Φf of output ends of the first optical fiber 501 and the second optical fiber 502 are smaller than diffraction limit resolution corresponding to the output diameter aperture; and Φf<λ/(2NAo), where λ is the wavelength of the light source, and NAo is the object space numerical aperture of the optical system to be measured 7. Since the first optical fiber 501 and the second optical fiber 502 are single mode optical fibers or polarization maintaining optical fibers, there is only one transmission mode in the optical fibers. Because the core diameters Φf of their output ends are smaller than the object space diffraction limit resolution of the optical system to be measured 7, their output light fields are ideal spherical waves within the object space numerical aperture NAo of the optical system to be measured 7. Light input from the first input end 5A and the second input end 5B is converted into ideal spherical waves which are respectively output from the first output end 5C and the second output end 5D, and the polarization states of the first output light 5C and the second output light 5D are perpendicular to each other, and then the light passes through the quarter-wave plate 510 to form left-handed circularly polarized light and right-handed circularly polarized light. A center distance between the fiber cores at the output ends of the first optical fiber 501 and the second optical fiber 502 is larger than a diameter of the image point defocused spot of the optical system to be measured 7 divided by magnification factor of the optical system to be measured 7. For example, if the diameter of the image point defocused spot of the optical system to be measured 7 is 3 μm and the magnification factor is ⅕, then the center distance between the fiber cores at the output ends of the first optical fiber 501 and the second optical fiber 502 is greater than 15 μm.

Figure 4:
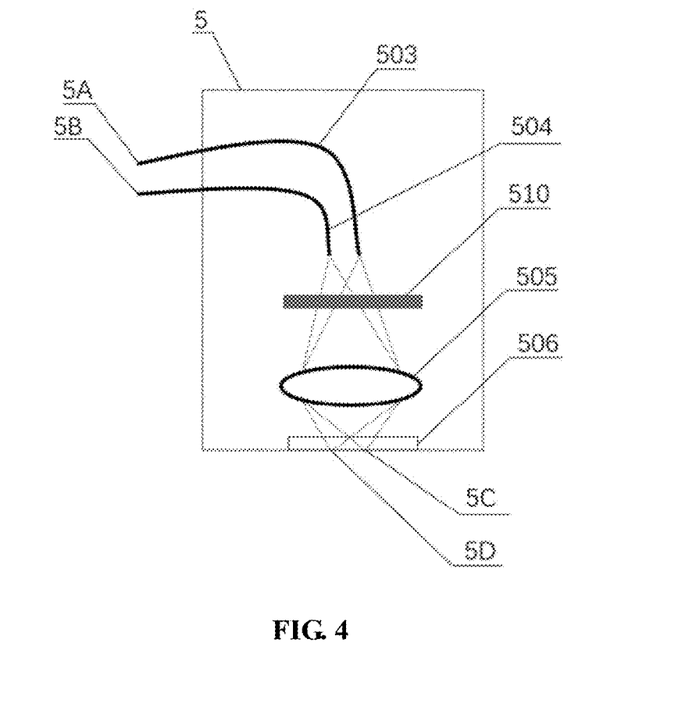
FIG. 4 shows the structure of the second embodiment of the ideal spherical wave generation unit in the present invention.
Figure 5:
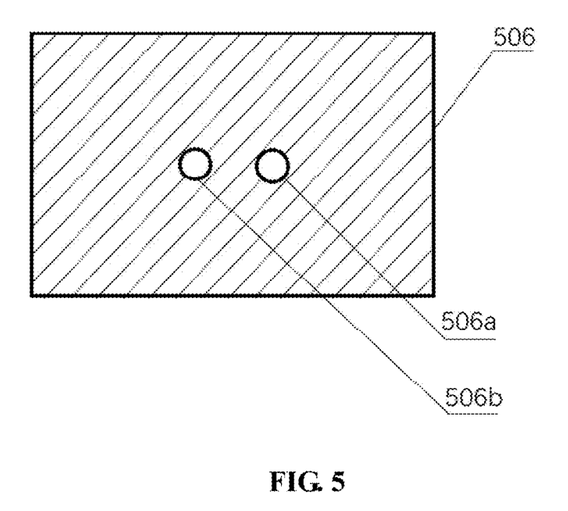
FIG. 5 shows the structure of the object plane mask in one embodiment of the ideal spherical wave generation unit in the present invention.

As shown in FIG. 4, the second embodiment of the ideal spherical wave generation unit 5 of the present invention may also be composed of a third optical fiber 503, a fourth optical fiber 504, a quarter-wave plate 510, an imaging lens assembly 505, and an object plane mask 506. FIG. 5 is a structural diagram of the object plane mask 506. An input end of the third optical fiber 503 is the first input end 5A of the ideal spherical wave generation unit 5, and the output end is located at an object plane of the imaging lens assembly 505. The input end of the fourth optical fiber 504 is the second input end 5B of the ideal spherical wave generation unit 5, the output end is located at the object plane of the imaging lens assembly 505, and the object plane mask 506 is located at the image plane of the imaging lens assembly 505. The object plane mask 506 is provided with a first circular hole 506a and a second circular hole 506b. The first circular hole 506a is the first output end 5C of the ideal spherical wave generation unit 5, and the second circular hole 506b is the second output end 5D of the ideal spherical wave generation unit 5. The output end of the third optical fiber 503 is imaged on the second circular hole 506b through the imaging lens assembly 505, and the output end of the fourth optical fiber 504 is imaged on the first circular hole 506a through the imaging lens assembly 505. The third optical fiber 503 and the fourth optical fiber 504 are single mode optical fibers or polarization maintaining optical fibers. Diameters Φh of the first circular hole 506a and the second circular hole 506b are smaller than the object space diffraction limit resolution of the optical system to be measured 7; and $\Phi h < \lambda/(2NAo)$, where λ is the wavelength of the light source, and NAo is the object space numerical aperture of the optical system to be measured 7. The first circular hole 506a and the second circular hole 506b on the object plane mask 506 has filtering effect on light field. Because their diameters Φh are smaller than the object space diffraction limit resolution of the optical system to be measured 7, their output light field is a ideal spherical wave within the object space numerical aperture NAo of the optical system to be measured 7. Light input from the first input end 5A and the second input end 5B is linearly polarized light with mutually perpendicular polarization states, which passes through the quarter-wave plate 510 to generate left-handed circularly polarized light and right-handed circularly polarized light. The center distance between the first circular hole 506a and the second circular hole 506b on the object plane mask 506 is greater than the diameter of the image point defocused spot of the optical system to be measured 7 divided by magnification factor of the optical system to be measured 7. For example, if the diameter of the image point defocused spot of the optical system to be measured 7 is 2 μm and the magnification factor is ⅕, then the center distance between the first circular hole 506a and the second circular hole 506b is greater than 10 μm.

Figure 6A:
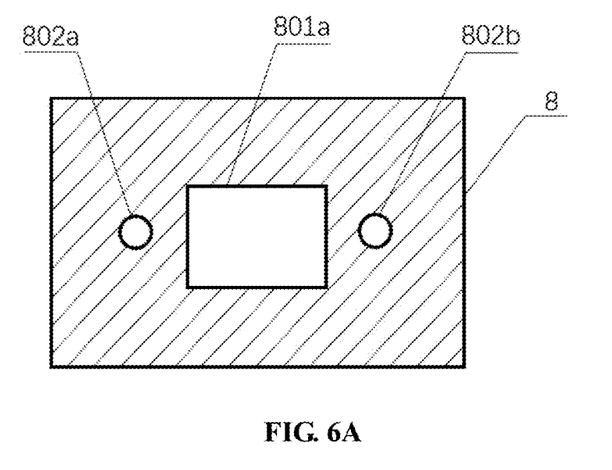
FIGS. 6A and 6B show the structure of two embodiments of the image plane mask in the present invention, respectively.
Figure 6B:
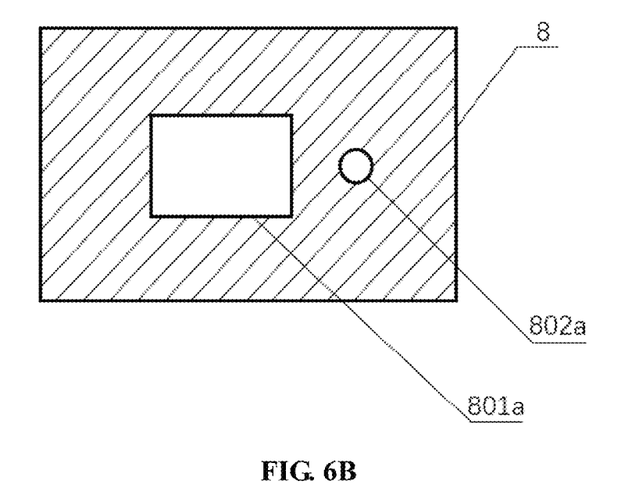

FIGS. 6A and 6B show the structure of two embodiments of the image plane mask of the present invention. In FIG. 6A, the image plane mask 8 comprises a light-transmitting window 801a, a first filtering circular hole 802a and a second filtering circular hole 802b, and diameters of the first filtering circular hole and the second filtering circular hole satisfy $\Phi i < \lambda/(2NAi)$, where λ is the wavelength of the light source, and NAi is the image space numerical aperture of the optical system to be measured 7. The light-transmitting window 801a is a quadrangular light-transmitting area allowing image point defocused spots imaged by the optical system to be measured 7 at the first output end 5C and the second output end 5D of the ideal spherical wave generation unit 5 to pass through without shielding. The light-transmitting window 801a, the first filtering circular hole 802a and the second filtering circular hole 802b are light-transmitting areas, and other areas are light-proof areas. The first filtering circular hole 802a and the second filtering circular hole 802b are located on left and right sides of the light-transmitting window 801a respectively. A shortest distance between the first filtering circular hole 802a and the second filtering circular hole 802b and an edge of a nearest optical window 801a is slightly larger than the radius of the image point defocused spot of the optical system to be measured 7. When the image plane mask adopts the structure shown in FIG. 6A, the positions of two field points of the optical system to be measured may be detected through one time of measurement.

The image plane mask 8 in FIG. 6B comprises a light-transmitting window 801a and a filtering circular hole 802a. Unlike FIG. 6A, there is only one filtering circular hole 802a, which may be located on the left or right side of the light-transmitting window. Other features are the same as those in FIG. 6A. When the image plane mask adopts the structure shown in FIG. 6B, only the position of one field point of the optical system to be measured can be detected through one time of measurement.

The light-shielding layer may be metal layer made of chromium or aluminum, or film layer such as Mo/Si multilayer film which obviously attenuates transmitted light.

Figure 7:
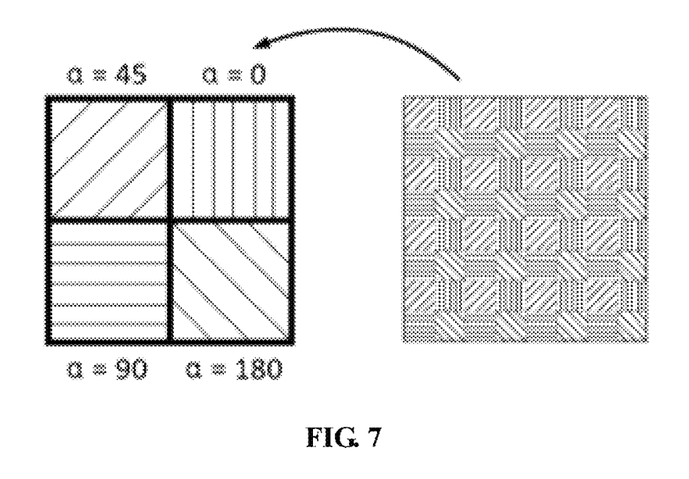
FIG. 7 shows the structure of one embodiment of the polarization phase shift module in the present invention.

As shown in FIG. 7, one embodiment of the polarization phase shift module 10 of the present invention is micro-polarization array. Every four adjacent polarizers in the micro-polarization array form a phase shift unit. Polarization directions of four polarizers in each unit are 0°, 45°, 90° and 135° respectively. The size of the polarizer is the same as that of the pixel unit of the two-dimensional polarization imaging photodetector (11), and each polarizer is aligned with one pixel unit of the two-dimensional polarization imaging photodetector (11).

When only one field point is measured at a time, a method for measuring wavefront aberration of the optical system to be measured by using the polarization simultaneous phase shift point diffraction interferometer described in FIG. 2 comprises the following steps:

(1) locating the output ends 5C and 5D of an ideal spherical wave generation unit 5 at a position of a field point to be measured in an object field of an optical system to be measured 7;

(2) using the data processing unit 12 to move the precision adjustment stage 9 to make an image point of the first output light 5C of the ideal spherical wave generation unit 5 imaged by the optical system to be measured 7 aligned with the center of the filtering circular hole 801a of the image space image plane mask 8, and the image point of the second output light 5D imaged by the optical system to be measured 7 located in the light-transmitting window 8 of the image plane mask 8;

(3) using the data processing unit 12 to adjust the first light intensity and polarization state regulator 3 and the second light intensity and polarization state regulator 4 to make polarization directions of the output light of the first output end 5C and the output light of the second output end 5D of the ideal spherical wave generation unit 5 perpendicular to each other, and the interference visibility is better than 0.6; obtaining an interference pattern; extracting, by the data processing unit, pixel units with the same phase shift from the collected interference patterns through sampling and combination to form four-step phase shift interference image with fixed additional phase difference π/2, and representing the light intensity distributions of the interference patterns as Is1, Is2, Is3 and Is4 respectively; calculating wrapped phase distribution WRs according to a phase shift interference phase extraction algorithm shown in formula (1), and obtaining phase distribution Ws after unwrapping the WRs's phase;

$$WR_s = \tan^{-1}\left(\frac{I_{s4} - I_{s2}}{I_{s1} - I_{s3}}\right) \quad (1)$$

(4) using the data processing unit 12 to move the precision adjustment stage 9 to make two output image points 5C and 5D of the ideal spherical wave generation unit 5 located in the light-transmitting window 801a of the image plane mask 8;

(5) using the data processing unit 12 to adjust the first light intensity and polarization state regulator 3 and the second light intensity and polarization state regulator 4 to make polarization directions of the output light of the first output end 5C and the output light of the second output end 5D of the ideal spherical wave generation unit 5 perpendicular to each other, and the interference visibility is better than 0.6; obtaining an interference pattern; extracting, by the data processing unit, pixel units with the same phase shift from the collected interference patterns through sampling and combination to form four-step phase shift interference image with fixed additional phase difference π/2, and representing the light intensity distributions of the interference patterns as It1, It2, It3 and It4 respectively; calculating wrapped phase distribution WRt according to phase shift interference phase extraction algorithm shown in formula (2), and obtaining phase distribution Wt after unwrapping the WRt's phase; and $$WR_t = \tan^{-1}\left(\frac{I_{t4} - I_{t2}}{I_{t1} - I_{t3}}\right) \quad (2)$$

(6) calculating the wave aberration Wr of the optical system to be measured 7 at the current field point by the formula Wr=Wt−Ws.

The phase shift interference phase extraction algorithm is expressed in the form of arctangent function, and the obtained phase distribution is truncated into plurality of areas varying within the range of 2π to form wrapped phases. In order to finally get continuous phase information, the areas of several truncated phases are spliced and expanded into continuous phases, which is called phase unwrapping.

Although the embodiments of the present invention have been shown and described, it is understood by those of ordinary skill in the art that various changes, modifications, substitutions and variations can be made to the embodiments without departing from the principles and spirit of the present invention, the scope of which is defined by the claims and their equivalents.

We claim:

1. A simultaneous phase-shift point diffraction interferometer, comprising:
    an ideal spherical wave generation module (5),
    an image plane mask (8),
    a polarization phase shift module (10),
    a two-dimensional polarization imaging photodetector (11), and
    a data processing unit (12) connected with the two-dimensional polarization imaging photodetector (11),
    wherein the ideal spherical wave generation module (5) is located in the object field of the optical system to be measured (7) and used for generating two beams, a left-handed circularly polarized light and a right-handed circularly polarized light;
    the image plane mask (8) is located on the image plane of the optical system to be measured (7), and comprises a light-transmitting window and a filtering circular hole, the light-transmitting window is used for allowing an spherical wavefront generated by the spherical wavefront generation module (5) to pass through to form measurement light with imaging system wave aberration information via the imaging system to be measured (7), and the filtering circular hole is used for generating reference spherical wave;
    and the polarization phase shift module (10) is used for converting input light into output light with different polarization states, and after realizing polarization phase shift, the two-dimensional polarization imaging photodetector (11) collects and stores measurement data.

2. The simultaneous phase-shift point diffraction interferometer according to claim 1, wherein the image plane mask (8) comprises a filtering circular hole (802a) and a light-transmitting window (801a), and the filtering circular hole (802a) is a light-transmitting hole with a diameter Φi smaller than an image space diffraction limit resolution of the optical system to be measured (7);
    Φi<λ/(2NAi), where λ is the wavelength of light source, and NAi is image space numerical aperture of the optical system to be measured (7); and
    the light-transmitting window (801a) is a quadrangular light-transmitting area allowing image point defocused spots imaged by the optical system to be measured (7) at the output end of the ideal spherical wave generation unit (5) to pass through without shielding.

3. The simultaneous phase-shift point diffraction interferometer according to claim 1, wherein the image plane mask (8) comprises a light-transmitting window (801a), a first filtering circular hole (802a) and a second filtering circular hole (802b) that are respectively located on two sides of the light-transmitting window (801a);

diameters of the first filtering circular hole and the second filtering circular hole are $\Phi i < \lambda/(2NAi)$, $\lambda$ is the wavelength of the light source, and NAi is the image space numerical aperture of the optical system to be measured (7);

the light-transmitting window (801a) is a quadrangular light-transmitting area allowing image point defocused spots imaged by the optical system to be measured (7) at the first output end 5C and the second output end 5D of the ideal spherical wave generation unit (5) to pass through without shielding; and the light-transmitting window (801a), the first filtering circular hole (802a) and the second filtering circular hole (802b) are light-transmitting areas, the other areas are light-proof areas.

4. The simultaneous phase-shift point diffraction interferometer according to claim 1, wherein the ideal spherical wave generation module (5) comprises a first optical fiber (501), a second optical fiber (502), and a quarter-wave plate (510);

the first optical fiber (501) and the second optical fiber (502) are single mode optical fibers or polarization maintaining optical fibers;

diameters $\Phi f$ of each fiber core at output ends of the first optical fiber (501) and the second optical fiber (502) are smaller than diffraction limit resolution corresponding to an output numerical aperture of the optical system to be measured 7;

$\Phi f < \lambda/(2NAo)$, $\lambda$ is the wavelength of the light source, and NAi is the image space numerical aperture of the optical system to be measured (7); and the center distance between the fiber cores at the output ends of the first optical fiber (501) and the second optical fiber (502) is larger than the diameter of the image point defocused spot of the optical system to be measured (7) divided by the magnification factor of the optical system to be measured (7).

5. The simultaneous phase-shift point diffraction interferometer according to claim 1, wherein the ideal spherical wave generation module (5) comprises a third optical fiber (503), a fourth optical fiber (504), a quarter-wave plate (510), an imaging lens assembly (505), and an object plane mask (506);

output ends of the third optical fiber (503) and the fourth optical fiber (504) are both located on the object plane of the imaging lens assembly (505), and the object plane mask (506) is located on an image plane of the imaging lens assembly (505);

the object plane mask (506) is provided with a first circular hole (506a) and a second circular hole (506b);

the output end of the third optical fiber (503) is imaged on the second circular hole (506b) by the imaging lens assembly (505), and the output end of the fourth optical fiber (504) is imaged on the first circular hole (506a) by the imaging lens assembly (505); the third optical fiber (503) and the fourth optical fiber (504) are single mode optical fibers or polarization maintaining optical fibers;

diameters $\Phi h$ of the first circular hole (506a) and the second circular hole (506b) are smaller than object space diffraction limit resolution of the optical system (7) to be measured;

$\Phi h < \lambda/(2NAo)$, $\lambda$ is the wavelength of light source, and NAi is the image space numerical aperture of the optical system to be measured (7); and the center distance between the first circular hole (506a) and the second circular hole (506b) on the object plane mask (506) is greater than diameter of the image point defocused spot of the optical system to be measured (7) divided by magnification factor of the optical system to be measured (7).

6. The simultaneous phase-shift point diffraction interferometer according to claim 1, wherein the polarization phase shift module (10) comprises a plurality of micro-polarization array units, polarization directions of four polarizers in each unit are 0°, 45°, 90°, and 135°, respectively, the size of the polarizer is the same as that of a pixel unit of the two-dimensional polarization imaging photodetector (11), and each polarizer is aligned with one pixel unit of the two-dimensional polarization imaging photodetector (11).

7. The simultaneous phase-shift point diffraction interferometer according to claim 1, wherein the two-dimensional polarization imaging photodetector (11) is CCD, CMOS, two-dimensional photocell array or two-dimensional photodetector array with the optical panel.

8. A method for detecting wavefront aberration of optical system by using the simultaneous phase-shift point diffraction interferometer according to claim 1, comprising:

(i) locating the output end of an ideal spherical wave generation module (5) at the position of the field point to be measured in the object field of the optical system to be measured (7);

(ii) making the image point of first output light 5(C) of the ideal spherical wave generation module (5) imaged by the optical system to be measured (7) aligned with the center of the filtering circular hole (801a) of image space image plane mask (8), and the image point of second output light 5(D) imaged by the optical system to be measured (7) located in the light-transmitting window (8) of the image plane mask (8);

(iii) making polarization directions of output light of the first output end (5C) and output light of the second output end (5D) of the ideal spherical wave generation module (5) perpendicular to each other; adjusting light intensities of the output light of the first output end (5C) and the output light of the second output end (5D) of the ideal spherical wave generation module (5) so that the intensity of the interference pattern collected by a two-dimensional polarization imaging detector (11) reaches 0.6-0.9 of the saturated light intensity of the photoelectric sensor, and the interference visibility is better than 0.6;

(iv) inputting the interference patterns collected by the two-dimensional polarization imaging detector (11) into the data processing unit (12), extracting, by the data processing unit (12), pixel units with the same phase shift from the collected interference patterns through sampling and combination to form four-step phase shift interference image with fixed additional phase difference $\pi/2$, then solving the phase by phase extraction algorithm, and performing phase unwrapping to obtain phase distribution which is the error calibration result Ws of the detection system;

(v) making two output image points of the ideal spherical wave generation unit (5) located in the light-transmitting window (801a) of the image plane mask (8);

(vi) inputting the interference patterns collected by the two-dimensional polarization imaging detector (11) into the data processing unit (12), extracting, by the data processing unit (12), pixel units with the same phase shift from the collected interference patterns through sampling and combination to form four-step phase shift interference image with fixed additional phase difference $\pi/2$, then solving a phase by phase extraction algorithm, and performing phase unwrapping to obtain phase distribution which is the direct measurement result Wt; and (vii) calculating, by the data processing unit, the optical system wave aberration Wr of the optical system to be measured at the field point where the output end of the ideal spherical wave generation unit is located by the formula Wr=Wt−Ws.

* * * * *